(12) United States Patent
Ward

(10) Patent No.: US 11,287,302 B2
(45) Date of Patent: Mar. 29, 2022

(54) METHOD AND DEVICE FOR MEASURING VOLUME OF CONTENTS OF A VESSEL OR PIPE USING CIRCUIT OSCILLATOR

(71) Applicant: David George Ward, Tacloban (PH)

(72) Inventor: David George Ward, Tacloban (PH)

( * ) Notice: Subject to any disclaimer, the term of this patent is extended or adjusted under 35 U.S.C. 154(b) by 0 days.

(21) Appl. No.: 16/603,824

(22) PCT Filed: Jan. 11, 2019

(86) PCT No.: PCT/NZ2019/050002
§ 371 (c)(1),
(2) Date: Oct. 8, 2019

(87) PCT Pub. No.: WO2019/147140
PCT Pub. Date: Aug. 1, 2019

(65) Prior Publication Data
US 2021/0285807 A1    Sep. 16, 2021

(30) Foreign Application Priority Data

Jan. 23, 2018    (NZ) ........................................ 739314

(51) Int. Cl.
*G01F 23/296*    (2006.01)
(52) U.S. Cl.
CPC ........ *G01F 23/296* (2013.01); *G01F 23/2966* (2013.01)
(58) Field of Classification Search
CPC ..... G01F 23/28; G01F 23/296; G01F 23/2966
See application file for complete search history.

(56) References Cited

U.S. PATENT DOCUMENTS

| 4,599,892 | A | * | 7/1986 | Doshi | G01F 23/296 73/149 |
| 4,640,130 | A | * | 2/1987 | Sheng | A61B 5/1073 73/149 |
| 7,343,819 | B2 | * | 3/2008 | Beck | G01F 1/3281 73/861.23 |
| 2009/0084178 | A1 | * | 4/2009 | Sinha | G01N 11/167 73/32 A |
| 2014/0254323 | A1 | * | 9/2014 | Sim | G01N 29/445 367/87 |

* cited by examiner

*Primary Examiner* — Benjamin R Schmitt
(74) *Attorney, Agent, or Firm* — Michael P. Eddy

(57) ABSTRACT

A circuit is set up for a container or vessel (10) as shown in FIG. 1, which has a microphone (20), a speaker (30), a frequency control device (40) volume control device (50), an amplifier (60), a frequency reader (70) and a spectrum analyzer (80). The oscillation in the circuit is created by applying power to the amplifier (60) which creates an initial fixed standing wave that does not move. Adjusting or changing components, invokes a new behavior of the circuit which is parasitic in nature and reading of oscillating frequency on the frequency reader (70) determines the change of conditions inside the vessel or container. The method is non-intrusive, and the method of this invention can also be used for measurement of miniscule quantities in microns or micro liters such as that of biofilm or algal growth.

17 Claims, 18 Drawing Sheets

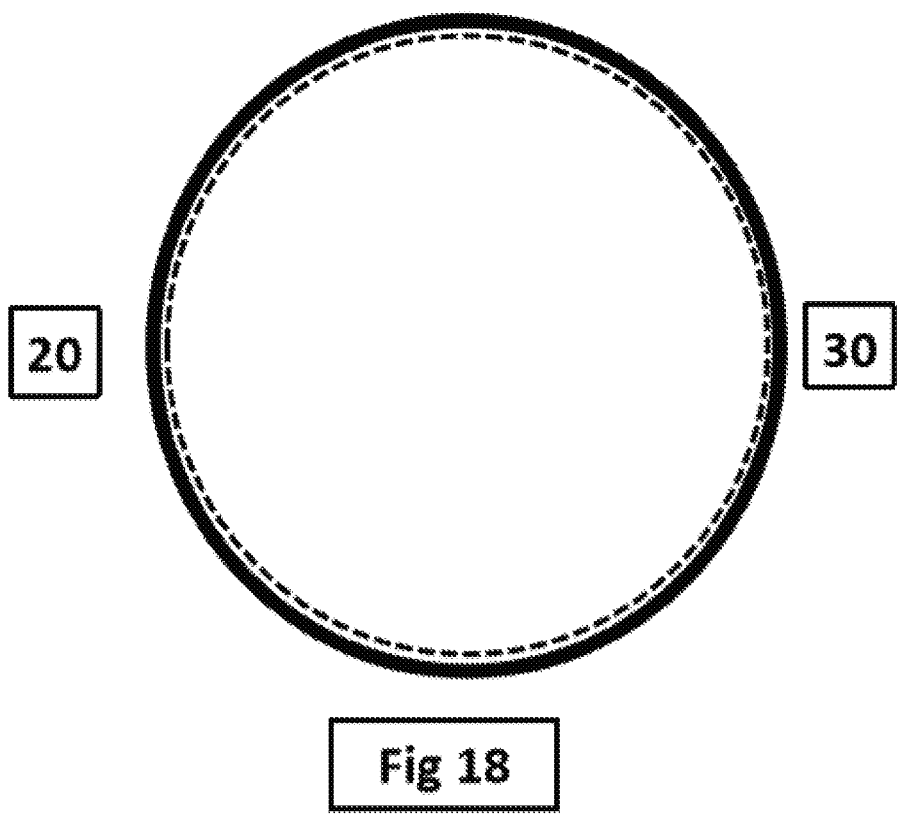

METHOD AND DEVICE FOR MEASURING VOLUME OF CONTENTS OF A VESSEL OR PIPE USING CIRCUIT OSCILLATOR

CROSS-REFERENCES TO RELATED PATENT APPLICATIONS

This patent application claims a priority benefit to New Zealand Patent Application No. 739314 entitled "METHOD AND DEVICE FOR MEASURING VOLUME OF CONTENTS OF A VESSEL OR PIPE USING CIRCUIT OSCILLATOR" filed on 23 Jan. 2018 and PCT Application No. PCT/NZ2019/050002 entitled "METHOD AND DEVICE FOR MEASURING VOLUME OF CONTENTS OF A VESSEL OR PIPE USING CIRCUIT OSCILLATOR" filed on 11 Jan. 2019, each of which are incorporated herein by reference in their entireties.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND

The inventive subject matter relates to various embodiments including a method of measuring the volume of contents, build-up or rupture of a vessel or pipe and provides a device to do so using a parasitic oscillator controlled by the resonant frequency of objects.

There have been numerous attempts in the prior art to measure changes in the content in a vessel or pipe by measuring the sound they make. However, these methods have severe limitations in their precision due to difficulty in separating the desired sound from background noise. There are numerous other methods for level measurement of vessels and pipes such as resonance, vibrating point, rotating paddle, admittance type, magnetic and mechanical float, pneumatic, conductive, ultrasonic, capacitive, optical interface, microwave, radar, magneto-restrictive, resistive chain, hydrostatic pressure, air bubbler, gamma ray, tap the side, listening.

The patent literature has many prior art patents where resonance frequency of a vessel has been used to determine the properties of its contents. For example, U.S. Pat. App. No. 2009/0084178 discloses a resonant system to measure density and viscosity of liquids within a pipe. The system relies on creating resonance within the pipe and detecting this resonance to determine the density and viscosity. The system relies on measuring the frequencies of the pipe by using filters to remove unwanted frequencies.

Similarly, U.S. Pat. No. 7,739,909 describes a system that monitors fluid levels in a cryogenic container. This system relies on sensors attached to the container to determine the resonant frequency of the container and liquid.

U.S. Pat. No. 3,569,827 describes a system that detects the dielectric mass of material in a resonant cavity container. The container and its contents are caused to resonate, and the resonant frequency is used to determine the dielectric mass of the material within the container.

Pat. No. EP0119790 A1 relies on stimulating a gas vessel and measuring the resulting resonance of the vessel through the signal processor.

A prior art patent, U.S. Pat. No. 6,247,361 describes a method that relies upon exciting a gas vessel with a loudspeaker and the resulting signal is picked up by a microphone. The frequency of the exciting signal is continually changing until the vessel begins to resonate.

Further, Pat. Nos. WO 2012072590A1 and EP2667176A1 rely on contact with gas inside a vessel and work on a similar principle to a load cell.

Pat. No. WO2012031302 measures multiple parameters of flowing fluids through a pipe including fluid density, flow rate, temperature etc. but does not measure the volume of the liquid in a container. It uses "chirps" (non-continuous signals) to avoid self-oscillation. A wave form generator is essential for the performance of sensor system used in this invention. No parasitic oscillations on the circuit are created in this invention as in this invention reported here.

Pat. No. WO2016161459 describes a set up for measuring 'gas-volume-fraction (GVF) and uses signal generator to create a signal that is then modified till it causes the pipe to resonate at its natural resonant frequency. By design this method can only produce indistinct peaks because of closeness to background noise.

U.S. Pat. No. 5,261,274 measures volume of the content in a container using resonance frequency for measurement. A transducer is tuned by electronic signals to the mechanical resonant frequency of the liquid container or tank. At resonance, the amplitude response of the tank is much larger than the noise of the environment.

Pat. No. WO2009042126 describes the use of "Lamb Wave" which travels along the surface of a pipeline and is widely used now in non-destructive testing for finding flaws or damages of pipe lines, aircraft structures, composites etc. However, this methodology is not suitable for measurements of content of container or pipe as in this invention.

Pat. No. WO2004003492 measures and monitors the flow rate and composition of fluid and uses swept-frequency ultrasonic signal to excite the fluid.

Pat. No. WO2015073313 uses an acoustic signal for assessment of the health of a pipeline segment whereby an acoustic signal is passed through the pipe in and difference between an active signal and a passive signal is used to detect leaks. This invention, however, measures the leak through the difference in volume inside the pipe or container which is accurate up to micro quantities.

U.S. Pat. No. 3,237,451 uses a simple concept of acoustic signal reflected off the surface of the liquid and back to the source mounted at the top of the container with reference cavities within the closed storage space equipped with pressure sensitive transducers.

The prior art also describes many other systems that rely on direct contact of a component of the circuit with the liquid in the container in order to allow a resonant signal to pass from a transmitter to a receiver. For example, Pat. No. GB813497 describes a system that senses the level of a fluid in a storage tank through a sensor. Upon the liquid level reaching the sensor, the transmitter sends the vibration signal to the receiver through the liquid causing the receiver to vibrate, thus detecting that the liquid has reached a specific level. This intrusive mechanism requires sensors be in contact with the liquid and also to pass through apertures in the container. Further, only one specific level of the liquid can be detected.

The prior art patent, U.S. Pat. No. 4,468,609A cites using an oscillator to detect leaks in jacketed pipes. This relies upon a leak being detected by two sensors and then becoming an oscillator. The electrodes serve as a frequency-determining element of an oscillator. When a leak is detected the circuit is activated.

U.S. Pat. No. 5,372,032A relies on pressure decay and flow, to determine leaks.

In most of the prior art patents mentioned above, the excitement is caused by the feedback signal due to 'Larsen Effect' known in the acoustics and resonance frequency of the container has been used to determine the properties of content in the container. These feedback signals create parasitic oscillations and crosstalk within the circuit whereby it may not behave in a manner for which it is actually designed. To counter this issue, the excitation signal is turned on and off by using 'chirp' and other means to suppress the parasitic oscillations. This is a serious shortcoming of the known prior art. In this invention, instead of suppressing this problematic parasitic oscillation, it is suitably controlled with due adjustment of the circuit whereby it is possible to use the parasitic oscillation itself gainfully as described in the 'description' section of this invention.

SUMMARY

According to aspects of the inventive subject matter, a method and device are provided to non-intrusively measure the content of a vessel by measuring the oscillating frequency of the oscillation circuit set up around the vessel instead measuring the resonant frequency as in the prior art. The resonant frequency of an object is seldom above the level of the background noise which makes it difficult to measure. In contrast the oscillation frequency of the oscillating circuit of this invention is stable and produces pronounced peaks making measurements easy and with extreme precision over an extended range of volume.

In one embodiment, the method is particularly useful for situations where intrusive measurement creates issues with product safety, toxicity or corrosivity and vessel or pipe integrity needs to be avoided. In another embodiment, the method is also useful where access to vessels or pipes is difficult, such as pipeline inspection and in-situ measurement from a remote location is essential. Further, in yet another embodiment, the method of this invention can also be used for measurement of minuscule quantities in microns or microliters such as that of biofilm or algal growth.

Other aspects of the inventive subject matter include various embodiments, for example in one embodiment for a given container or vessel (10) which can have a variable amount of content in liquid, solid, semi-solid or granular form, a suitable parasitic oscillation circuit can be set up as shown in FIG. 1 wherein self oscillation is created by applying power to the amplifier (60) and can be viewed on a spectrum analyzer (80) corresponding to the volume of the content in the container (10).

Since resonance of the container (10) varies as per the volume of the content in the container (10) and hence produces a specific oscillation of the circuit whose frequency can be measured by frequency reader (70), the change in the frequency as observed by the frequency reader (70) provides a direct measure of the volume change in the container (10).

To set up a parasitic oscillation circuit with a view to measure the variability in the content in the container (10), a circuit is created with the components as shown where microphone (20) has a given fixed frequency and volume response, the speaker (30) also likewise has a fixed frequency and volume response and the amplifier (40) also has a fixed frequency response and power output. A given set of microphone (20), speaker (30) and the amplifier (60) with their fixed frequency and volume responses would produce an oscillation circuit of a unique frequency. Any change in the specification of these components (20, 30 and 60) would produce different oscillations of the circuit. Thus, a wide variety of combinations of these components is possible producing different oscillating frequencies. It is therefore essential to narrow down the choice of these components which produce a stable parasitic oscillating frequency that is controlled by the volume of content of the container. The choice of correct combination of the components and their settings is achievable through the use of spectrum analyzer. The parasitic oscillation circuit is set up with sophisticated components of high levels of specification, accuracy and reliability which are essential part of technology back-up that underpins modern music industry. The oscillation circuits of this invention are highly cost-effective in terms of the cost versus efficiency.

The oscillation circuit of FIG. 1 provides a frequency control device (40) and a volume control device (50) along with a spectrum analyzer (80) used to find the combination of components with appropriate frequency responses that produce an oscillation in the circuit in relation to the changes in the volume of the container (10). The frequency is read on the frequency reader (70).

The frequency control device (40) and volume control device (50) and spectrum analyzer (80) may be removed once the desired combination of components is determined. The parasitic oscillation frequency of the circuit as measured on the frequency reader (70) provides a direct measure of the volume or content in the container (10) based on the standardized calibration already done.

In this way, the embodiments of the inventive subject matter provide methods of determining the volume or content of the container (10) from the reading of parasitic oscillating frequency on the frequency reader (70) based on the resonance frequency of the container (10) with variable content.

DETAILED DESCRIPTION OF THE DRAWINGS

Having thus described the inventive subject matter in general terms, reference will now be made to the accompanying drawings, which are not necessarily drawn to scale and the icons/symbols used for various components in the drawings are for representation of the circuits behind the actual concept, and wherein:

Figure 8:
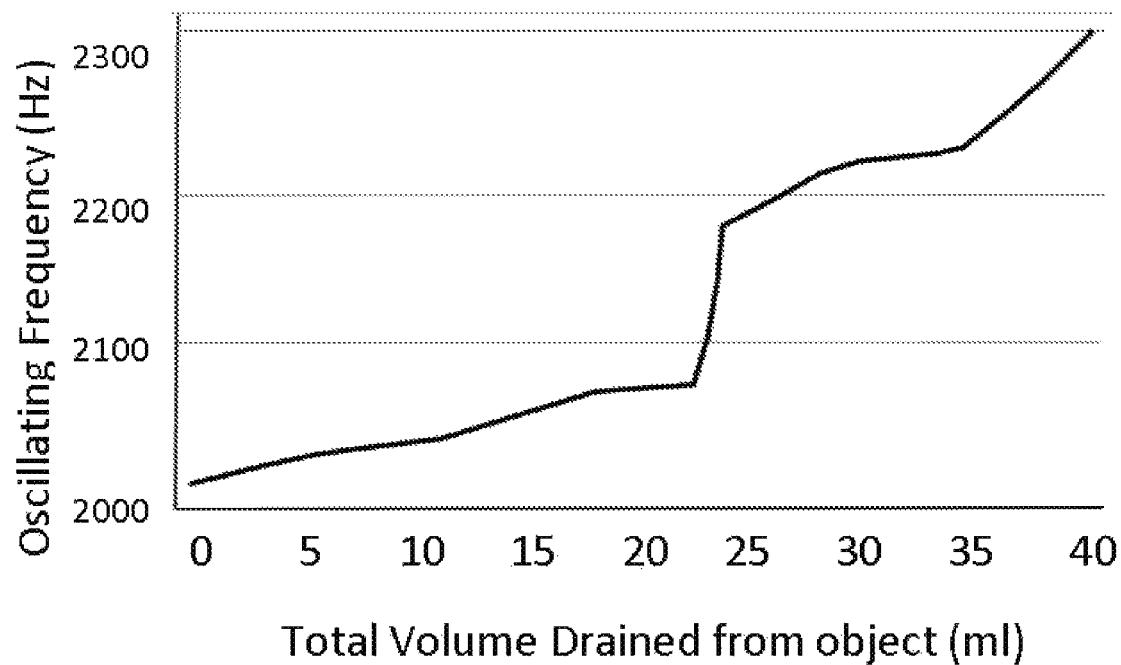
Figure 9:
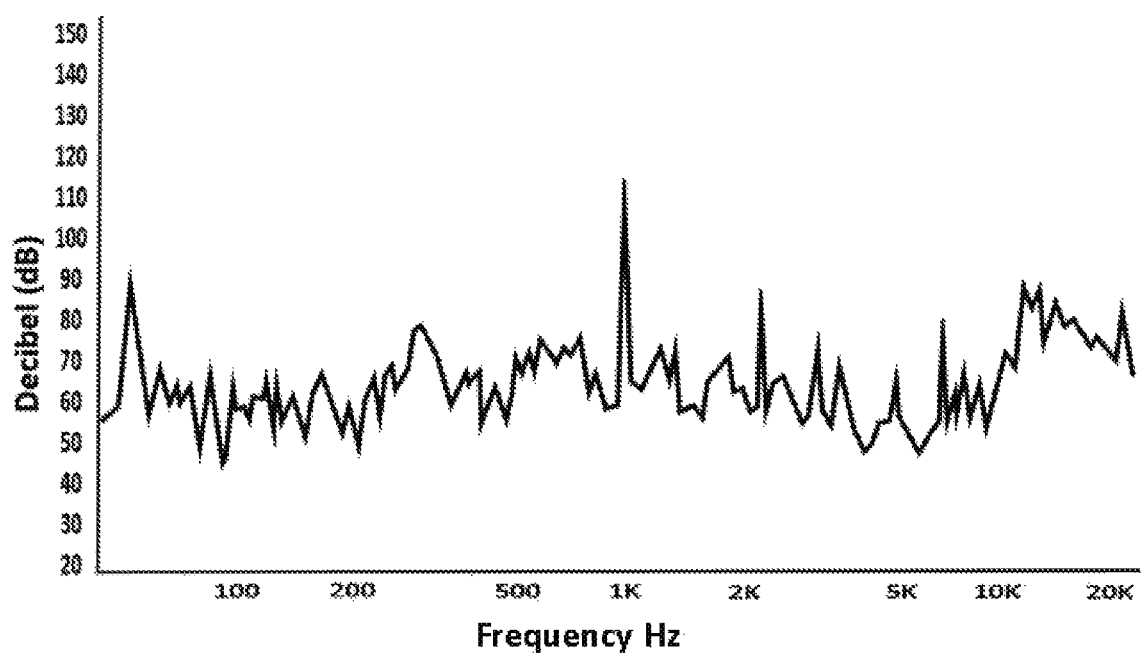
Figure 10:
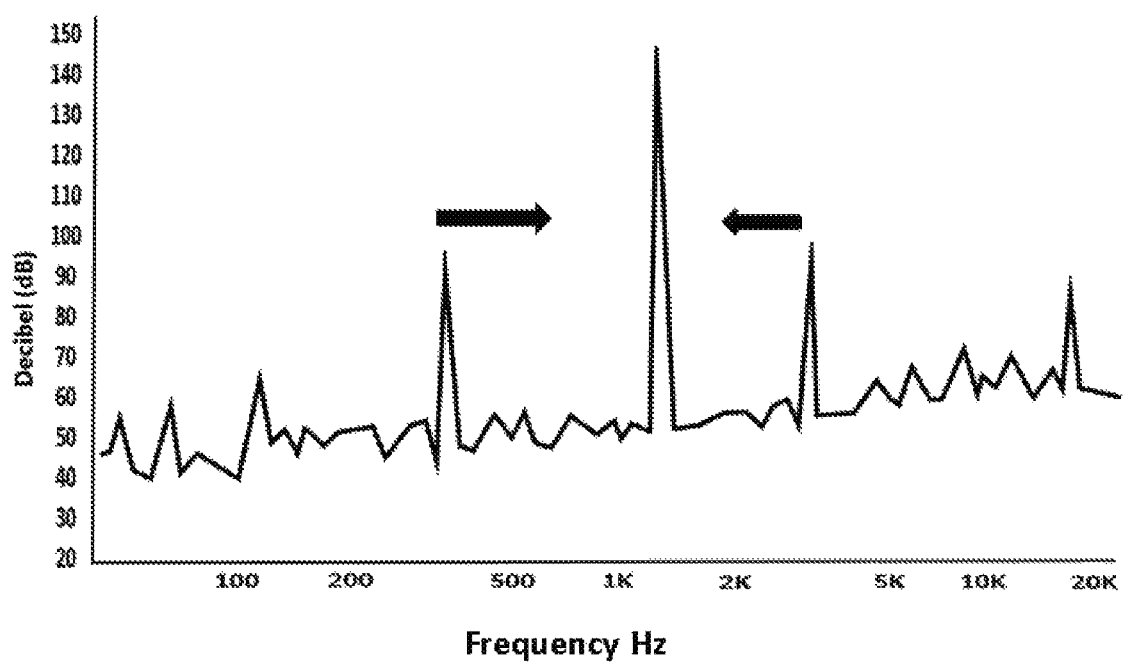
Figure 11:
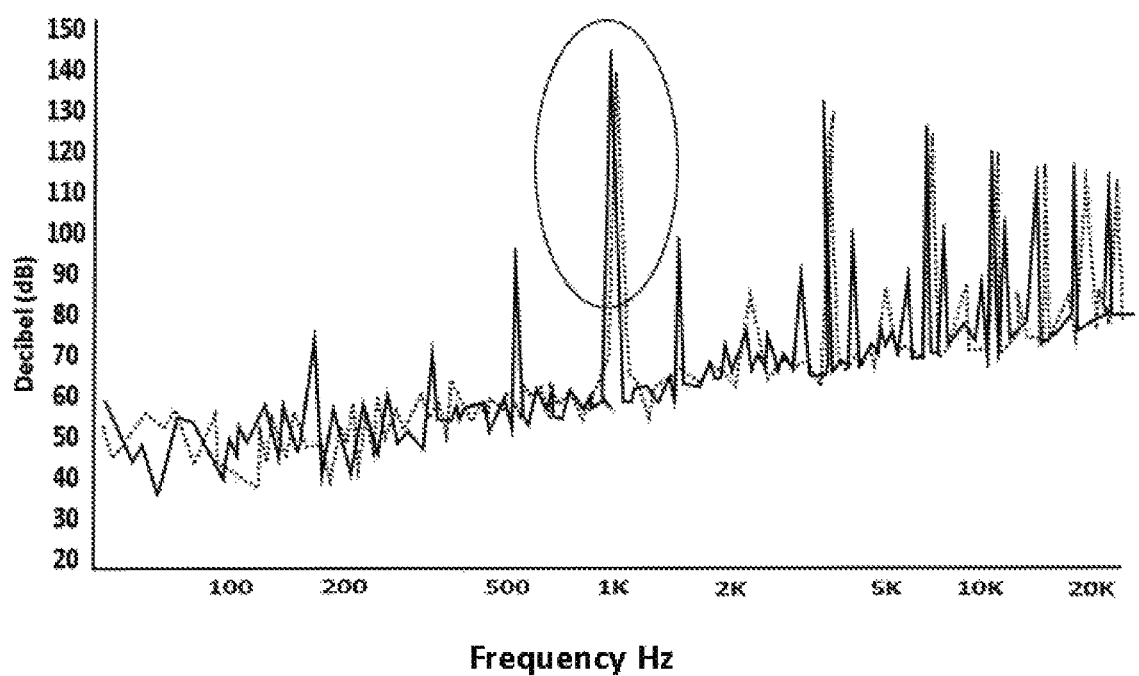
Figure 12:
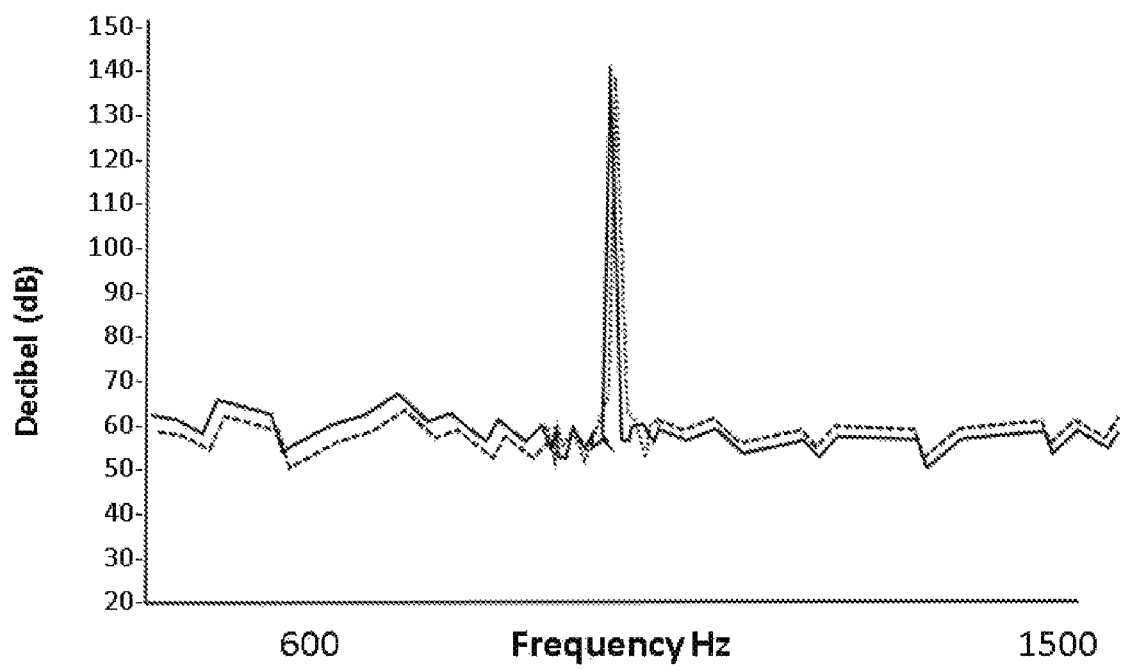
Figure 13:
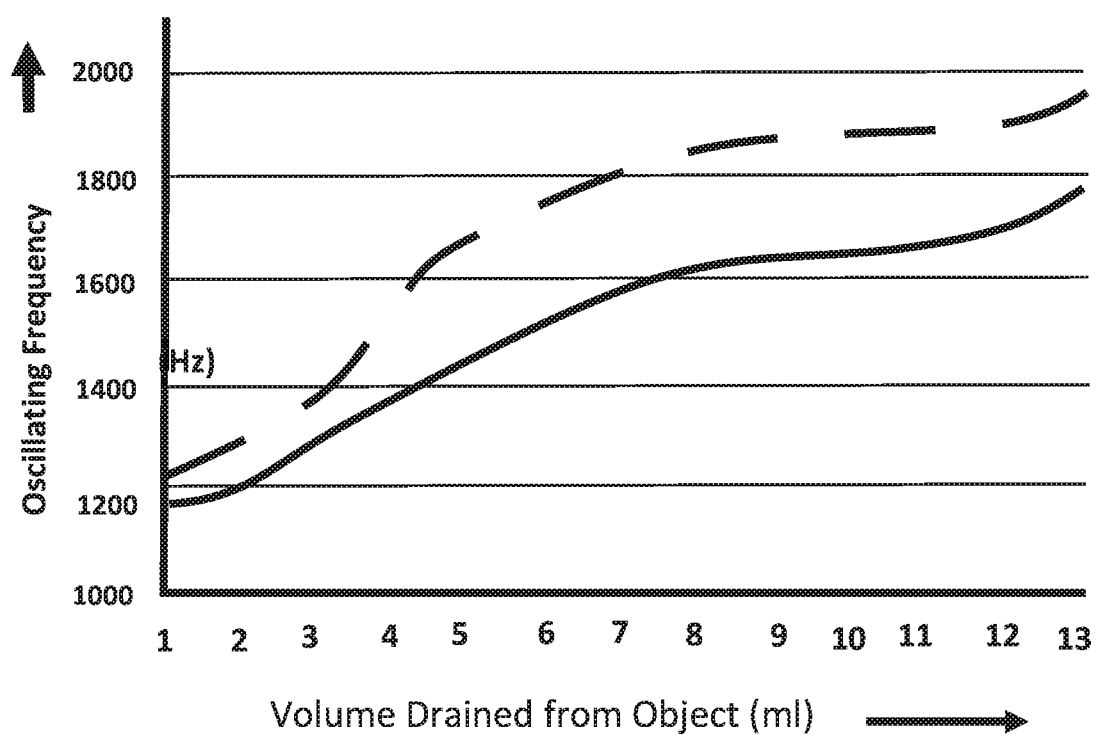
Figure 14:
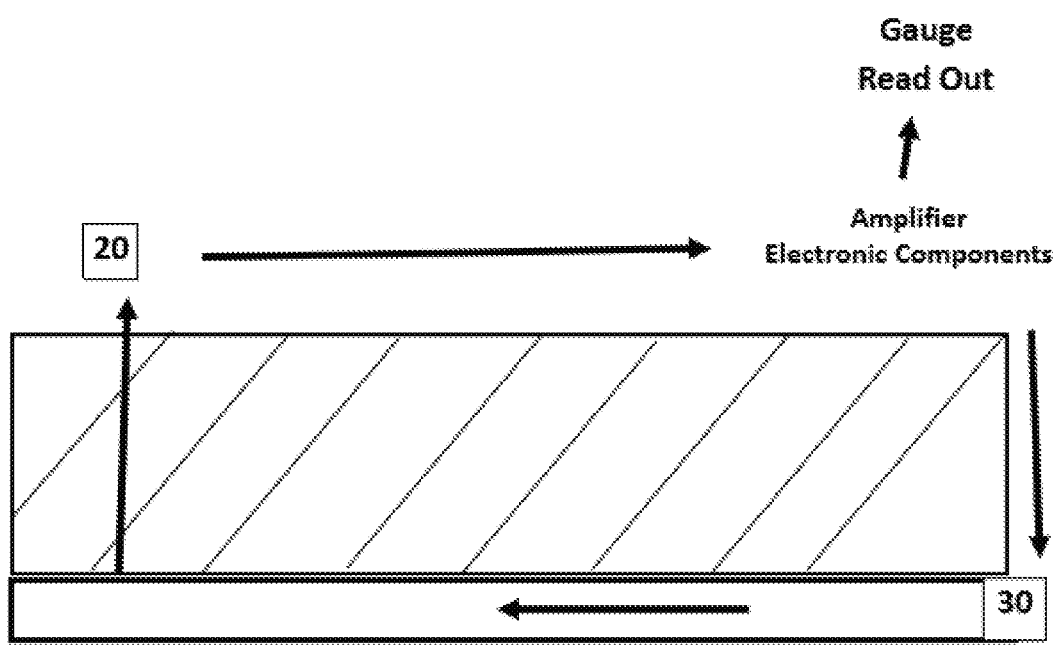
Figure 15:
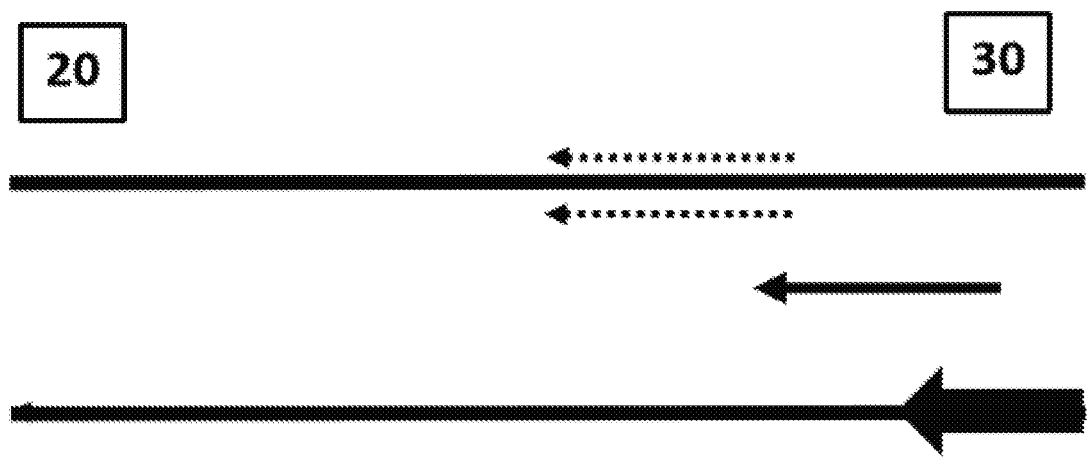
Figure 16:
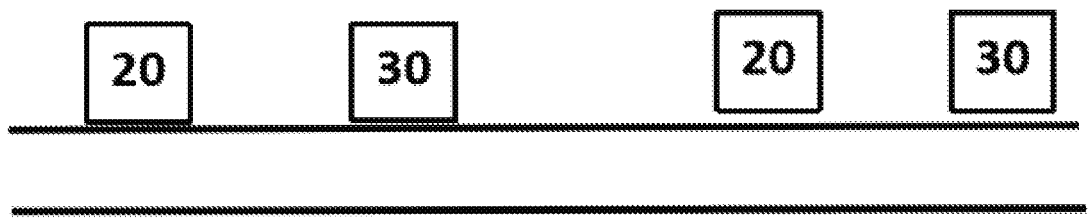
Figure 17:
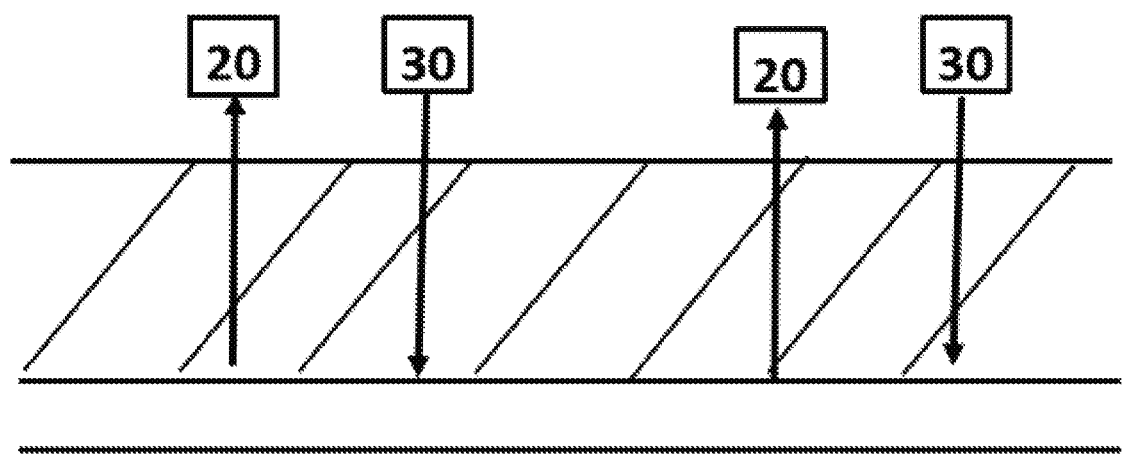

FIG. 8 shows setting up of an unstable/unbalanced oscillating frequency circuit where the decreasing volume of the content versus frequency response follows one sine curve up to a point and then jumps to follow another sine curve having the frequency range in which the circuit has been set up in this example is in the range of 2000 Hz-2300 Hz and an initial sine curve drops at 2100 Hz to 2200 Hz and goes up in another sine curve;

FIG. 9 shows a random initial frequency response of an oscillating circuit;

FIG. 10 shows parasitic oscillation frequency curve after adjustments of circuit components are carried out with two satellite peaks that can be moved by adjustment to produce a peak that changes with contents of container;

FIG. 11 shows identification of frequencies that change with the changing content of the object;

FIG. 12 showing the result of further modification of circuit components and read out to produce a workable frequency;

FIG. 13 shows a new response curve different from the previous one on altering the settings of an already stable circuit;

FIG. 14 shows an arrangement where ground microphone or a similar device can be used while setting up an oscillating circuit according to embodiments of the inventive subject matter;

FIG. 15 shows the configuration of speaker and microphone, if measuring contents along the length of the pipe through oscillating frequency;

FIG. 16 shows the configuration of multiple sets of speaker and microphone, if measuring contents along the total length of the pipe through oscillating frequency;

FIG. 17 shows the configuration of speaker and microphone, if measuring contents of buried piped at different cross-sections along the length through oscillating frequency; and FIG. 18 shows the configuration of speaker and microscope when measuring the biological growth inside the objects. e.g. the pipes.

DETAILED DESCRIPTION OF THE EMBODIMENTS

The following reference numerals are shown in the diagrams and referred to in the detailed description:

10=container or vessel having a liquid or solid content of unknown volume
20=microphone
30=speaker
40=frequency control device
50=volume control device
60=amplifier
70=frequency reader
80=spectrum analyzer Whereas the basic circuit design of a parasitically oscillating circuit controlled by the resonance of a container whose content needs to be measured with readings of oscillating frequency has been briefly described above, the fundamental principles which form the key inventive steps of this invention will now be described with various embodiments. Possible embodiments of the present invention are described here with reference to the figures and the numerals referred therein. A person of ordinary skill in the art will appreciate that many variations and alterations to the embodiments described herein are within the scope of the invention. Accordingly, the following embodiments of the invention are set forth without any loss of generality to, and without imposing limitations upon, the claimed inventive subject matter.

As previously mentioned, in prior art patents, much of the excitement is caused by the feedback signal due to 'Larsen Effect' known in the acoustics and resonance frequency of the container has been used to determine the properties of content in the container. These feedback signals create parasitic oscillations and crosstalk within the circuit which are sought to be minimized to avoid disturbances caused to the resonance frequencies used for measurement of the properties of the content of container. In this invention, instead of suppressing this problematic parasitic oscillation, it is suitably controlled with due adjustment of the circuit whereby it is possible to use the parasitic oscillation itself gainfully for measurements. It is known that more complicated the circuits are, it is often more difficult to control the associated parasitic oscillation. In this invention, however, the circuit is simplified to include bare minimum of components and a spectrum analyzer is used that helps to deliberately set up a parasitic oscillation that is controlled by changes in the container.

This invention is the first instance to deliberately use the parasitic oscillation frequency of the circuit instead of the resonance frequency of the container, to determine the properties and volume of the content. It has been found that the oscillation frequency of circuits, and the devices based on them offer unmatched power to determine the material contained in a vessel down to micron level without physically handling the material and/or container from a remote location. This kind of precision and ease offered by this novel approach opens up immense possibilities of the building and utilizing the devices based on oscillation frequency circuits described in this invention. The principle of oscillation frequency and the method to set up the parasitic oscillation frequency of circuits for practical applications are explained hereunder.

Linking parasitic oscillating circuits with the natural resonance of a vessel or pipe produces a clear signal that is not easily affected by background noise. When the resonant frequency of the vessel or pipe changes, this causes the parasitic oscillating frequency of the oscillating circuit to change. This invention, therefore, provides a novel method of determining the contents of a vessel or pipe by measuring the parasitic oscillating frequency.

The key aspect of this invention is to self-excite the vessel or pipe (object) with a speaker and feed the resultant signals into a parasitically oscillating circuit. It is a key requirement of this circuit that with a specific combination of components in the circuit and with proper adjustments, the oscillating frequency of the circuit turns into a form of parasitic oscillation. Initially one may observe a feedback frequency due to 'Larsen Effect' which is essentially a stationary standing wave frequency which would not change with the contents of the container. There are, however, smaller peaks around the stationary standing wave frequency which are mobile and change with the content of the container. On suitable adjustments of various components of the circuit, these smaller peaks coalesce with the sharp stationary standing wave frequency thereby the parasitic oscillating frequency of the stationary standing wave becomes nonstationary and begins to correspond with the content of the container. This parasitic oscillation frequency which is no longer stationary is used for measurements. It is this phenomenon of conversion of a stationary standing wave to non-stationary standing wave of the parasitic oscillation which enables us to provide us an improvement over the known prior art.

It is important to deploy a correct combination of the components in the circuit and have proper adjustments to have a stable circuit for any practical use. The parasitic oscillating frequency of the circuit which is directly related to the resonant frequency of the object is used for measurement instead the resonant frequency of the prior art. The parasitic oscillating frequency of the circuit may or may not be the same as resonant frequency of the object; most often, it may not be the same but is quite pronounced. Since the resonant frequency of an object is directly proportionate to the content it holds, the measure of parasitic oscillating frequency provides a method to determine the content of the object. Parasitic oscillation changing the design functions of the circuit and components is the fundamental principle on which this invention is based. Thus, the method described in this invention does not directly measure the resonance of an object but measures peaks in a parasitically oscillating circuit and hence overcomes the shortcomings of the prior art. This is the key inventive step of this invention which is also novel and not reported before anywhere.

Larsen Effect

Acoustic feedback (also known as Larsen Effect after the name of the Danish scientist who first observed it) is a special kind of positive feedback which occurs when a sound loop exists between an audio input and an audio output. It is a form of parasitic oscillation in the acoustic range and produces a fixed frequency response. In most public address systems, this feedback effect is readily recognized as a loud squeal or screech as a result of amplified sound output of the speaker being captured by the microphone. Such a feedback is considered undesirable when it occurs in such systems and therefore efforts are made to suppress it. Deliberate use of this feedback began since 1960s with a desire to produce unconventional sounds e.g., in electric guitar. The narrow and fixed nature of the signals are used as exciters in many inventions.

Further, with advances in acoustic and ultrasonic systems, the commercial use of Larsen Effect also gained currency and many scientists started looking at potential uses of it. The Larsen Effect produces a set of almost pure tones. Because the quality factor of the resonance is very narrow the Larsen Effect is very sensitive to any modifications of the system and the propagation properties of the medium. Some potential uses of Larsen Effect have been described in a review article by Julien De Rosny and Maxime Carron (2012) [Julien De Rosny, Maxime Canon. MIMO feedback and application to detection. Socété Françaised'Acoustique. Acoustics 2012, April 2012, Nantes, France. 2012. (https://hal.archivesouvertes.fr/hal-00811006/document)].

In 2006, Weaver and Lobkis demonstrated that the linewidth of the Larsen's Effect in a highly reverberating medium depends on the ratio between the spectral power density of the background noise and the intensity of the howl. With this approach, they monitored the temperature and the effect of the water drop in an aluminum block using an ultrasonic feedback. [Richard L. Weaver and Oleg I. Lobkis. On the linewidth of the ultrasonic Larsen effect in a reverberant body. The Journal of the Acoustical Society of America, 120(1):102-109, 2006. (http://dx.doi.org/10.1121/1.2205128)].

Lobkis and Weaver further studied the relaxation time of the feedback effect when a brief transient load is applied on a cement bar [Oleg I. Lobkis and Richard L. Weaver. On the Larsen effect to monitor small fast changes in materials. The Journal of the Acoustical Society of America, 125(4):1894-1905, April 2009. (https://doi.org/10.1121/1.3081530)].

Parasitic Oscillation

When a circuit self oscillates parasitic oscillation develops. This causes the circuit to no longer behave in the manner for which it was designed. The more complex the circuit the more problematic parasitic oscillation becomes. Signal processors and other devices inserted into circuits to control the Larsen effect themselves are susceptible to parasitic oscillation. In other uses of the Larsen effect the signal is turned on and off to prevent the formation of a parasitically oscillating circuit. Electronic control theory is used to control parasitic oscillation. A common method is to increase the power of amplifiers in a circuit.

Cross Talk

A signal from one part of a circuit can bleed into another part of a circuit. In audio it is known as cross talk. The sound from one channel can be heard in another. This invention therefore draws from such advances seeking potential uses of the Larsen Effect but provides a further improvement. Based on the understanding that resonance of a vessel/pipe is known to change with its conditions, this method exploits Larsen Effect to observe a feedback frequency of a standing wave when the circuit is further adjusted to allow it to act like a tank circuit where the stationary standing wave turns into a non-stationary standing wave. This is how the circuit of this invention is set up, which is a parasitically oscillating circuit which produces a sharp frequency response varying in accordance with the condition of the vessel or pipe. Such a frequency response could easily function in the frequency range of milli Hz to several MHz in ultra-sonic range.

Setting Up of Oscillating Circuit

Figure 1:
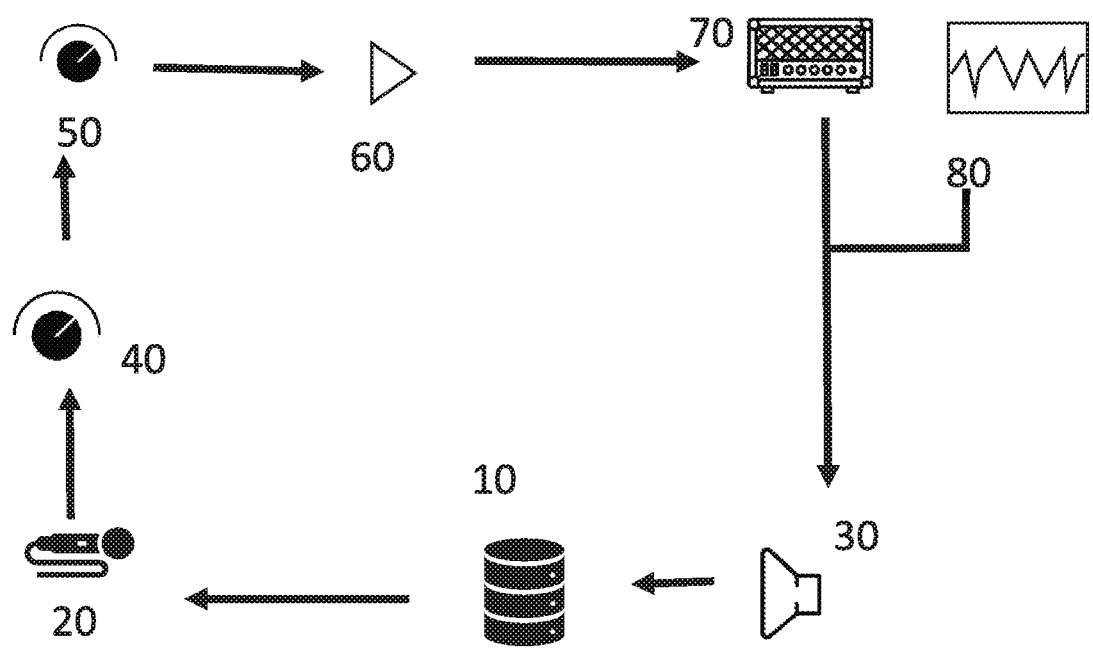
FIG. 1 shows a basic set up of a parasitic oscillating frequency circuit including the container (10) whose content needs to be measured with the reading of the parasitic oscillating frequency.

Setting up of an oscillating frequency circuit for an object is shown in FIG. 1, the working of which, in essence, is reverse of how radio and TV tuners work. In electronic tuners, the circuit is adjusted to select a frequency, whereas in this invention the change in resonance of the object changes the frequency of the oscillating circuit.

Finding the Desired Oscillating Frequency

Figure 2:
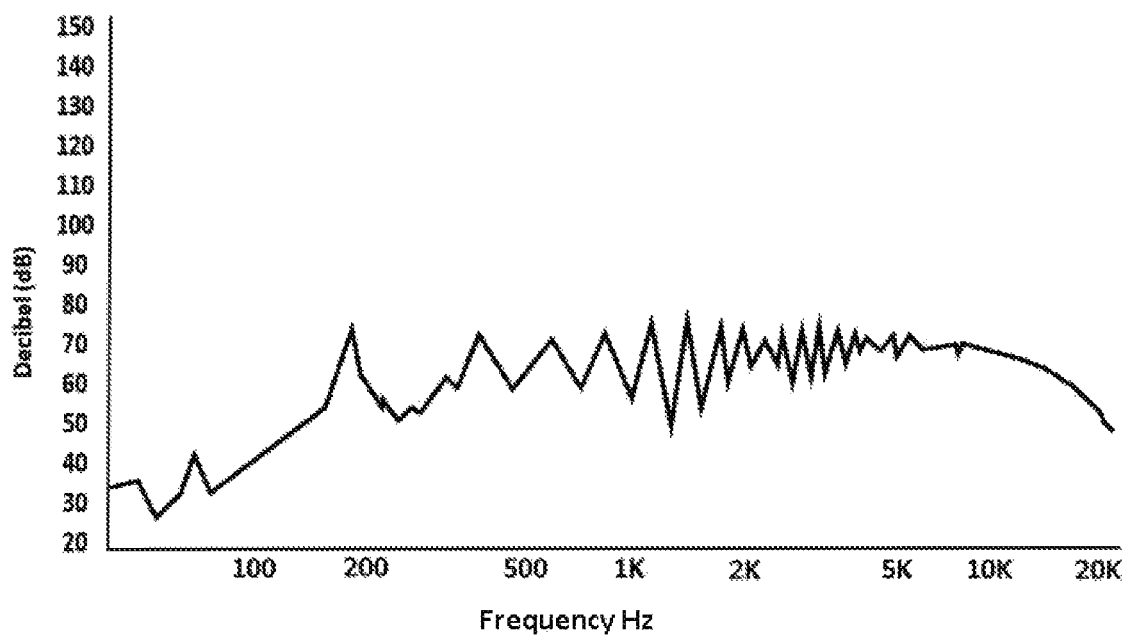
FIG. 2 shows a normal resonant frequency curve of an object which is close enough to the background noise.

After setting up an oscillating circuit as shown in FIG. 1, it is important to find the desired oscillating frequency. A feed is attached to a spectrum analyzer (80). The background signal on the spectrum analyzer (80) before the amplifier (60) is powered will be similar to FIG. 2 showing resonant frequency of the object barely away from the noise floor. It is to be noted that a computer-based or smartphone spectrum analyzer can be used having a 1/24 octave or greater resolution.

Figure 3:
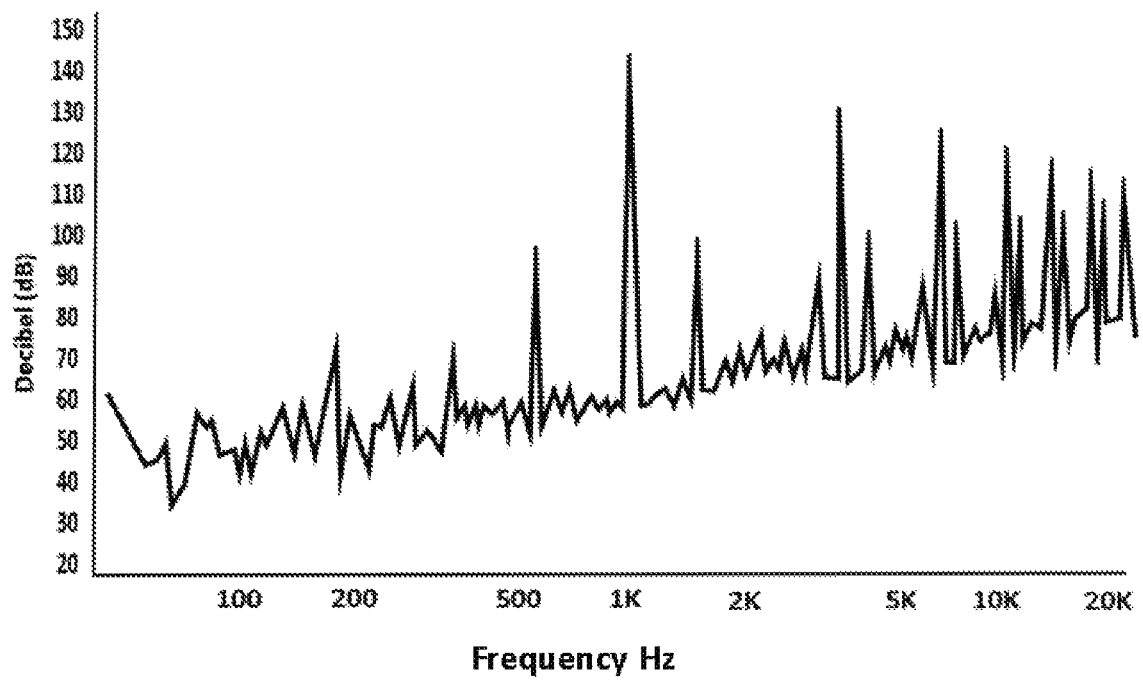
FIG. 3 shows an oscillating frequency curve of the same object as in FIG. 2 with pronounced peaks.

After adjustments to various components of the circuit made until the frequency response as shown in FIG. 3 is obtained, the effort is made to identify the frequencies of interest. Some of these frequencies would be associated with the vessel or pipe while the others may be associated with the conditions inside the vessel or pipe. This can be identified by altering the conditions inside the vessel or pipe (i.e., by adding or removing the content) and measuring the frequency response. A change in the peak may appear which is associated with the inside condition of the vessel or pipe. If no peak moves with changes being made in the condition of the vessel, it is an indication that further adjustments to the volume or other settings of the amplifier are required; even changing the microphone, speaker or amplifier and changing the positions of microphone or speaker may also be required.

Figure 4:
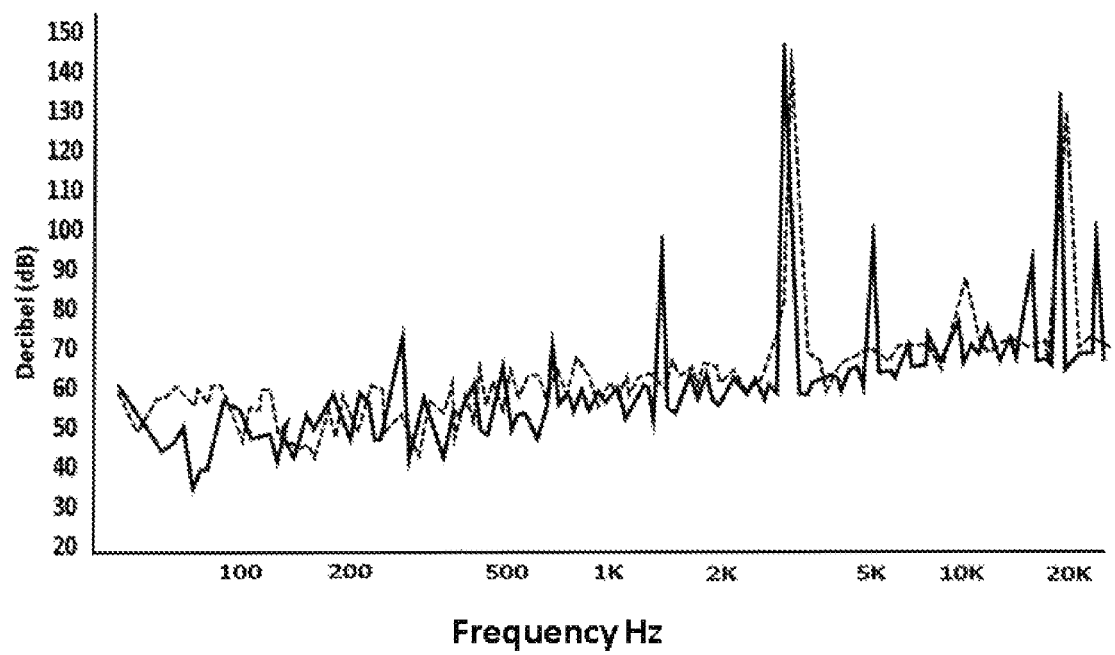
FIG. 4 shows oscillating frequency curves of the same container having different volumes of content and with change in frequency in the two curves being proportionate to the volume change in the container.

Not all frequencies produced by the oscillating circuit are associated with the object, yet some of the frequencies can be found changing with the condition of the object as shown in FIG. 4. Thus, an oscillating circuit as in FIG. 1 is set up that passes through the object using a microphone and speaker. The gauge can be attached anywhere on the circuit that is part of the signal path. The circuit is constructed so that resonant changes associated with the level, build up, or rupture inside a pipe or vessel would cause the oscillating frequency of the circuit to change as in FIG. 5. The speaker causes the vessel or pipe to resonate and the microphone picks up the resonance caused by the speaker. When the signal from the microphone feeds back into the oscillating circuit, the resonance of the circuit begins to change as the conditions inside the vessel/pipe change thereby allowing the measurement of the oscillation changes corresponding to build up, level, or rupture inside a vessel or pipe.

Frequency Response of the Oscillations

Figure 6:
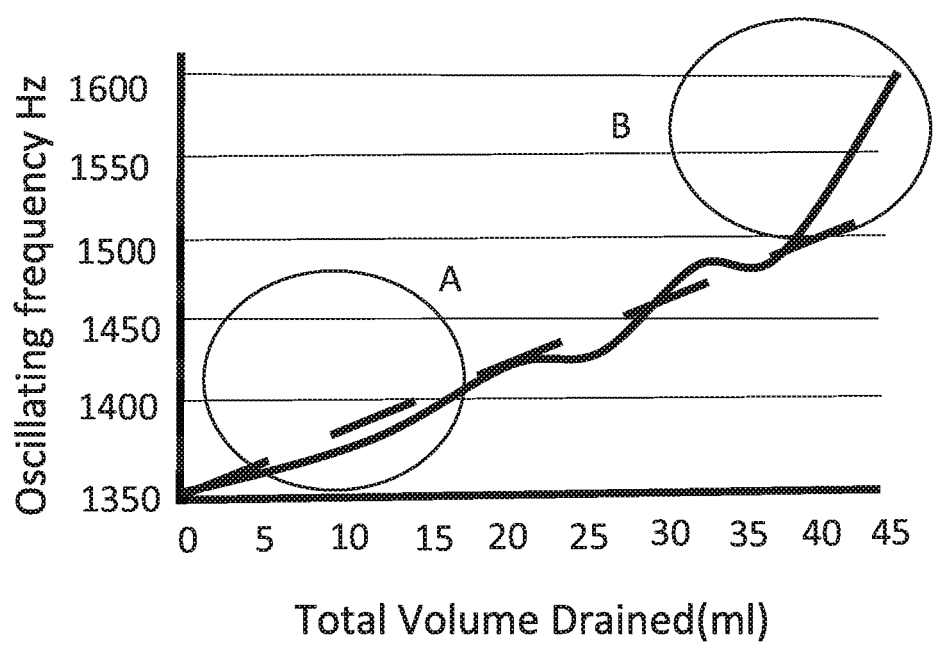
FIG. 6 shows oscillating frequency in sine curve of an object with its diminishing content.
Figure 7:
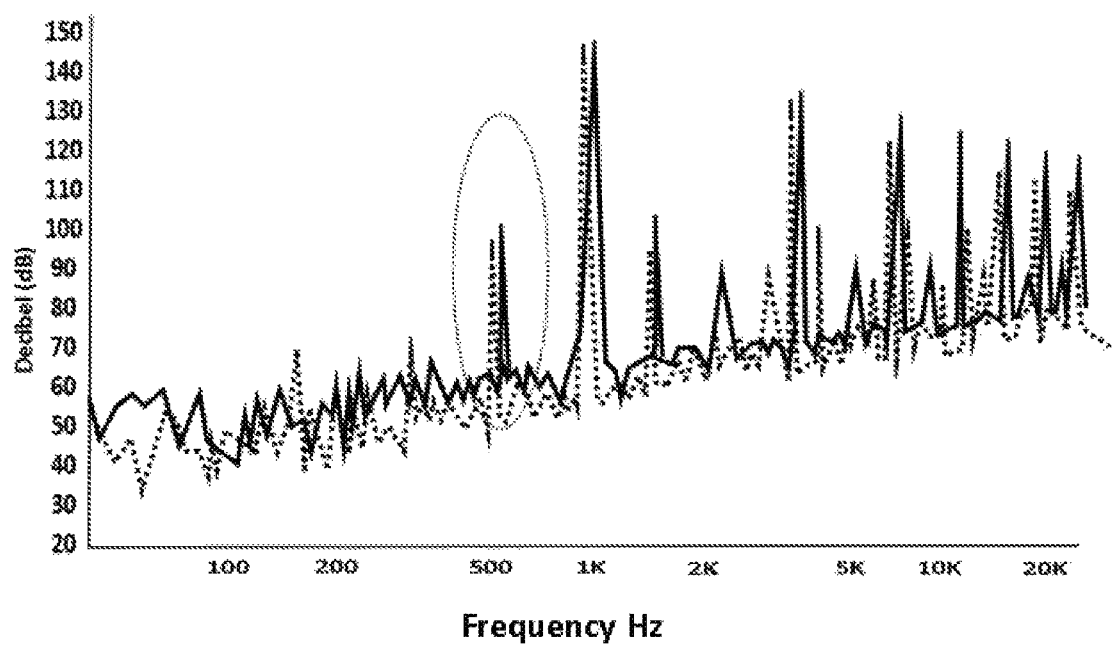
FIG. 7 shows oscillating frequency curve of an object with complex mixture of frequencies, many of which may not be related to the content of the object, i.e. which do not shift and remains static when the content of the object undergoes change.

When the oscillating circuit is set up in balance with the resonant frequency of the vessel or pipe, the frequency response to the change in the content of the object appears as an "S" or sine curve as shown in FIG. 6. This is the typical response of a tank circuit. The response frequency will either rise or fall dependent upon whether content of object is diminishing or increasing. If there is a frequency such as the one encircled in FIG. 7 that does not change with change in conditions of the object that cannot obviously be used for measurement and needs to be ignored. In the circumstances, when a balance has not been achieved while setting up of the oscillating circuit, the response may unexpectedly fluctuate even when the change in the object is occurring smoothly. This condition has been depicted in FIG. 8 where an initial sine curve drops at 2100 Hz to 2200 Hz and goes up in another sine curve. If the settings of the oscillating circuit are incorrect the oscillating circuit will switch over to measuring a different resonant frequency as conditions change, e.g., it may change from measuring the liquid inside to measuring air gap above the liquid. If the frequency response which is usually reliable and stable over a long period of time disappears or changes, this indicates a variation inside the pipe or vessel, usually a rupture, leak or build-up. The peaks of an oscillation can be very narrow and have dB readings in excess of 150 dB A typical sequence of the screen shots of frequency response during this adjustment process could be as follows:
  i. An Oscillation is set up as in FIG. 9.
  ii. The oscillating frequency circuit is adjusted as in FIG. 10.
  iii. A frequency that changes with conditions inside the vessel or pipe is identified as in FIG. 11.
  iv. The oscillating circuit and read out are modified to produce a workable frequency as in FIG. 12.
In summary, the following three typical responses from the described circuit can be observed:
  i. In the first response the circuit would act like a public address system and amplify sounds without distortion;
  ii. In the second response the Larsen effect appears producing a pure tone that does not move; and
  iii. In the third response the circuit will change in response to the condition of the content of the container when the circuit is adjusted to behave like a tank circuit.

This adjustment and changes brought into the circuit may be referred to as 'Ward Effect' based on this invention.

Placements of Microphone and Speaker

Where the microphone and speaker are placed will have an effect on the oscillation of the circuit. As a general rule, the further apart they are the greater volume of sound will be required to produce an oscillation. Further, low-frequency sound travels faster and decays less so can be used when larger distances are to be travelled. If ultrasound is to be used the speaker and microphone will need to be closer together.

The noise the oscillating frequency circuits can be considerably controlled by appropriate choice of microphones, and speakers, their placement as well as frequency and volume of oscillating circuit.

Choosing Appropriate Frequency to Use

All vessels and pipes have fundamental resonant frequencies and subsequent node frequencies. Once a fundamental frequency is found the frequency of the oscillating circuit can be modified so the preferred signal moves. At times it may be desirable to shift into the ultrasonic range to avoid noise issues with appropriate care since ultrasound is known to be injurious at high volumes. At other times lower frequencies may be chosen so they can travel longer distances underground.

Making the Final Devices

A number of considerations may be taken into account while designing and making a device for specific end-use. These are:
  i. Operating conditions where the device will be used;
  ii. Cost of the device;
  iii. Specific problem(s) to be addressed;
  iv. Environmental issues;
  v. Frequency range to work in;
  vi. Device to work in continuous mode or in off/on mode; and
  vii. Safety considerations including noise levels.

Characteristics of Resonant Frequencies of Vessels

It is well known that every object has a unique resonant frequency and when the physical property of the object changes, the sound produced by it also changes. The resonant frequencies are often very close to background noise or the noise floor as shown in FIG. 2. Historically, there have been numerous attempts to measure the level of a content of the vessel by measuring resonant frequency in the prior art some of which have been cited in the previous sections. These have had, however, produced limited and unsatisfactory results due to following reasons:
  i. Resonant characteristics in a vessel are complex. Some frequencies will change as the object change, and others will be stable. There are multiple frequencies to choose from.
  ii. The background noise is higher and the desired signal is mixed with background noise.
  iii. There may be coincidental frequencies that relate to the level or part of the vessel or pipe.

iv. There may be false notes or harmonics.

Most efforts in the past rely on forcing a vessel to resonate, then measuring the resulting resonance, or the decay of the resonance. In contrast to the above, this invention measures the effect of the resonance of an object on the oscillating circuit, which then stabilizes and elevates the desired resonant frequencies (chosen by the response observed on a spectrum analyzer) as shown in FIG. 3.

Using an Oscillating Circuit

A tank circuit is a type of the oscillating circuit. The most common application of tank circuits is tuning radio transmitters and receivers. For example, when we tune a radio to a particular station, the tank circuits are set at a resonance for that particular carrier frequency. They only work within a specific range. This invention works in a similar way. The circuit is tuned to a particular frequency range. Provided the resonance of the vessel or pipe is within this range, the oscillation of the circuit will change with the resonant frequency of the tank. Just as a radio tuner will only pick up signals within a certain range, the oscillating circuit will only oscillate in response to the resonant signals from the vessel or pipe, within a certain range. An analogy is that a radio tuner may have a variable capacitor which alters the signal received. With the oscillating circuit of this invention, the vessel or pipe becomes the variable tuner, which locks onto the resonant frequency being measured.

Frequency Response of an Oscillating Circuit

Figure 5:
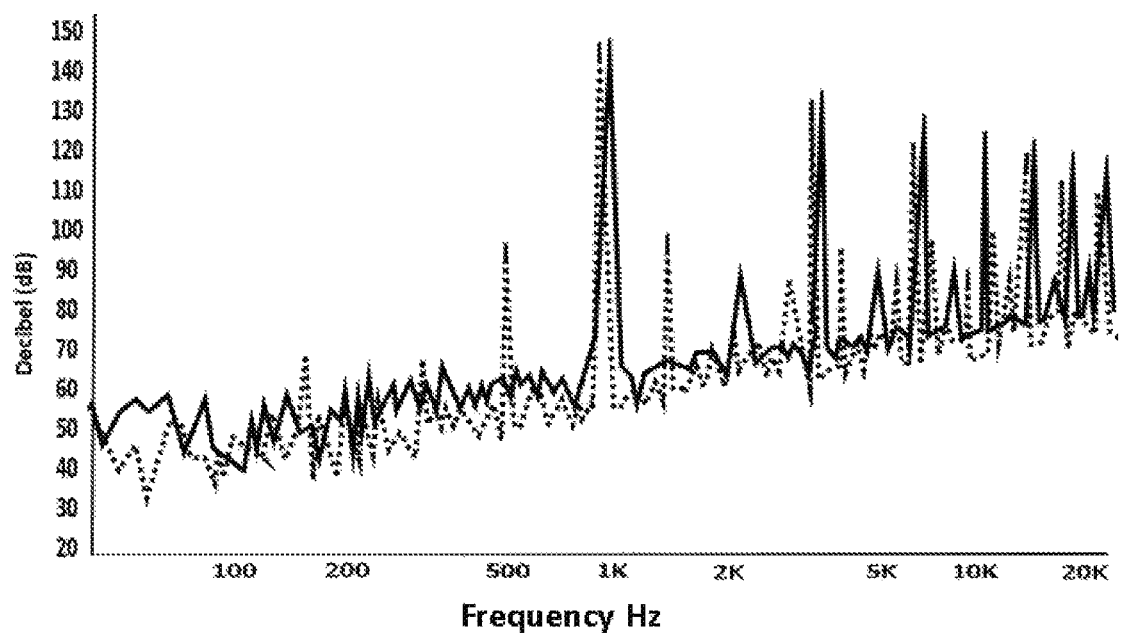
FIG. 5 shows oscillating frequency curves of the same container having different volume of content in the frequency range of 100 Hz-20 kHz demonstrating that measurements can be taken in ultrasonic range as well.

If the Oscillating Circuit is in balance a stable and repeatable pattern of frequency response will be reproduced. This pattern changes with the changes in the conditions of vessel or pipe as shown in FIG. 5.

If the settings of the circuit are altered but are still in balance, a new response curve that differs from the original curve would appear as shown in FIG. 13.

Microphones

There are a large number of microphone types available that can be used for the circuit described in this invention. For example, these can be of the type: condenser, electrical condenser, dynamic, ribbon, carbon, piezoelectric, fiber optic, laser, liquid, MEMS, contact, boundary, directional, shotgun, parabolic, hydrophones, wireless, ground and a speaker, etc. Since each microphone has a bias as to what frequencies, it will favor, what direction and distance it will pick up signals from, an impedance, a fundamental resonant frequency, the choice of microphone for an intended circuit would largely depend on the application. For most uses, the microphone will be a contact or boundary type, attached to the side of the vessel or pipe.

Ground microphones like those used in seismic surveys can be used to detect sound in the ground. A device like that is shown in FIG. 14 can be constructed provided that sound travels better through the pipe or contents than through the ground. This can be achieved by selecting frequencies that travel through the pipe better. Alternatively, signal effects like reverberation or delay can be introduced to the circuit to cause the sound traveling through the ground to decay faster than through the pipe or contents.

Speakers

A speaker converts an electrical signal to sound or vibration. Each speaker has a frequency, polar pattern, resonant frequency, and directional bias. Various types of speakers as available are: diaphragm, moving iron, ground, piezoelectric, magneto-static, magneto-restrictive, electrostatic, ribbon, and planarmagnetic, blending wave, flat panel, heil air motion transducers, transparent ionic conduction, plasma arc, thermos-acoustic, digital, wireless and contact speakers. Besides its intrinsic bias, the distance of the vessel or pipe from the speaker will also affect the oscillation of the oscillating frequency circuit. For most uses, the commonly found contact speaker may be a good choice. The other type of speakers, such as ground speakers, may be used when no contact with the vessel or pipe is preferred.

Amplifier and Electrical Components

These comprise of an amplifier and any switches, filters, capacitors, and control devices that form part of the circuit. The amplifier and electronic component package will have its own frequency range over which it will oscillate. Once the setting for the oscillating frequency circuit is found, the setting of the amplifier is fixed. The circuit described in this invention is with a view to avoid extensive signal processing. In some cases, the amplifier and electronic components may be switchable so as to measure different parameters inside the pipe or vessel.

Readout

The peak being measured will change in thousandths of Hz. The readout can be calibrated to the resolution required. This allows the conditions inside the vessel or pipe to be read correctly. In most cases the signal will need to be calibrated to provide a linear reading as the signal would be a "Sine" or "S" curve as shown in FIG. 6. A portion on the "S" curve may be selected to approximate a straight line as shown by 'A' and 'B' in the inset in FIG. 6. In cases where accuracy within a margin of error is sufficient, the readings can be taken direct.

Signal Processors

Although these are not essential for the method, they can be used in some situations and embodiments.

Advantages and Scope of This Invention

As can be envisaged, this invention provides numerous advantages and wide-ranging applications, some of which can be described below:

i. Non-intrusive: The method of this invention provides measurements to be taken from the outside of the vessel or pipe to avoid issues with product safety, toxicity and/or corrosivity;

ii. Remote Monitoring: Using directional microphones and speakers to avoid contact with a container, the method of this invention can also provide a means of measurement from a distance;

iii. Low power: The wattage of equipment used can be relatively low because the sound is focused on a very narrow band. The peaks of the oscillation can have a resolution of 1/1000th of a Hz, requiring less power than a broad-spectrum sound;

iv. Intrinsic safety: The device of this invention can also be made intrinsically safe by operating below a sound level of 105 dB for the ultrasound and 85 dB for the acoustic range;

v. Accuracy and precision: The method of this invention allows measurements to be taken in wide range running from multiple units of measurements down to micro level viz., meters, micrometers, liters, microliters, kilohertz, micro-hertz etc. This is useful for the high resolution of measurement of biofilm build up, algal growth or individual bacterial colony;

vi. Low cost: The manufacturing costs of devices made based on this invention is likely to be low as allow components described in the invention are easily available commercially very cheaply; and vii. Varied industrial applications: The method and device of this invention involving oscillating circuits can be put to several industrial uses, e.g., a) measuring along the length of a pipe configuring the speaker and microphone as shown in FIG. 15, b) measuring also along the total length of the pipe as shown in FIG. 16, c) measuring the buried pipes intermittently at different cross-sections as shown in FIG. 17, d) measuring the build-up of biofilm, algal growth etc. in the pipes as shown in FIG. 18, e) The method can be set up to measure the resonant frequency of individual bacteria inside the pipes or containers which may be in different range (~35,000 KHz) as against the other content (1 KHz) providing a comprehensive status of the changes, f) In certain situations, an evanescent wave may be measured that travels along the inside of the pipe.

Best Mode of Performing the Invention

The best mode of performing this invention is demonstrated here with the following actual experiments. For setting up of oscillating circuits as shown in FIG. 1, the following components were used with the objects (10) mentioned in the example:

Microphone (20): Schaller Oyster (ordinarily used as pick up for a guitar);

Speaker (30): Mini LCD Screen Speaker CAT.NO: AS3024 (Specification—power handling 1WRMS impedance—4 ohm);

Frequency control device (40): EQ section of XENYX802 Behringer mixing desk;

Volume control device (50): Chanel 1 volume control, Phones/Ctrl room volume control, Main Mix;

Volume control section of the XENYX802 Behringer mixing desk;

Amplifier (60): Headphone amplifier built into XENYX802 Behringer mixing desk accessed via phones socket;

Frequency reader (70): Digitech QM1535 multi-meter set to measure Hz accessed via main out socket; and Spectrum analyzer (80): 1/24$^{th}$ Octave TRU RTA spectrum analyzer software package accessed via cd tape out of desk and entered into a computer by Behringer U control UCA222 audio I/O.

Attention should be paid to the power supply as fluctuations in mains power can affect the performance of the circuit. After adjustments the circuit will become stable and only be affected by large power fluctuations. All Knobs are set to the 12 O'clock and adjustments are made by viewing spectrum analyzer.

EXAMPLE 1

Measuring the Content of a 50 ml Burette With Oscillating Frequency

After setting up of a stable circuit as in FIG. 1 with the above components including the 50 ml burette as per the procedure explained above.

An oscillating frequency peak appeared at approximately 1396 Hz. The burette was slowly drained off, and the oscillating frequency curve against the receding volume of the burette plotted. A curve similar to an 'S' curve as explained above was obtained as shown in FIG. 6 result. The burette was refilled and drained off again. Measuring the oscillating frequency corresponded with the volume of content in the burette. The circuit was found stable and results repeatable.

EXAMPLE 2

Measuring the Content of a Can of CRC 5.56 With Oscillating Frequency

In this experiment, the burette was replaced with a can of CRC 5.56 to determine its content with oscillating frequency. The peak oscillation, in this case, appeared at 830 Hz. The steps used to measure the content of the burette as in example 1 above were followed and a corresponding plot of oscillating frequency versus the drained volume of the can was likewise obtained.

EXAMPLE 3

Measuring the Content of a 7 kg LPG Bottle with Oscillating Frequency

In this experiment, the circuit was set up as described in example 1 above substituting the burette with a 7 kg LPG bottle. Setting all controls at their initial position, a peak was observed at 1396 Hz but was found to be unaffected by the change in the content of the LPG cylinder. In addition to the main peak at 1396 Hz, two small peaks (FIG. 10) appear alongside that were seen to be responding to the change in the contents of the LPG bottle. Turning volume control of channel one of the mixer to the 9 O'clock position caused the twin peaks to merge into the main oscillation and produced a standing wave at 1479 Hz. The shape of the oscillation also became sharper, and the circuit was stable. The peak frequency of this oscillation at 1479 Hz was successfully used to determine the change in the contents of the container.

The key aspects of the present invention have been described by way of above examples for better comprehension of the concept and methodology involved. It should be appreciated that modifications and additions may be made thereto without departing from the scope thereof as defined in the appended claims.

I claim:

1. A parasitic oscillation circuit for non-intrusively measuring and monitoring the content of a container, vessel or pipe with an oscillation frequency comprising:

a microphone, a speaker, an amplifier, a container and contents, and a frequency reader; wherein—the parasitic oscillation circuit self oscillates to produce a the oscillation frequency of a non-stationary 'standing wave' that is controlled by changes in the container, vessel or pipe being measured and this oscillation frequency differs from the resonant frequency of the container, vessel or pipe; wherein the volume of the content of the container, vessel or pipe varying with time corresponds to the observed oscillation frequency of the parasitic oscillation circuit involves the use of at least one spectrum analyser having resolution of 3 Hz or greater as part of the circuit during the setting up process which is used to identify the frequency lies of interest that correspond with changing content of the vessel or pipe by intercomparison of different components and their combinations used in the circuit and the same spectrum analyser may be removed from the circuit after identification of at least one frequency of interest.

2. The parasitic oscillation circuit of claim 1 wherein said parasitic oscillation circuit is multiple sets of parasitic oscillation circuits with at least one set of speaker and microphone configured so that for each set of microphone and speaker, the microphone receives the audio signal from the corresponding speaker.

3. The parasitic oscillation circuit of claim 1 wherein the oscillation frequency is in the range of twenty Hz to twenty-five thousand kHz.

4. The parasitic oscillation circuit of claim 1 wherein the oscillation frequency is identified to be responding to the changes in temperature, pressure, volume and mass of the solid, liquid, semisolid or gas content of the container, vessel or pipe of the oscillation circuit to be measured.

5. The parasitic oscillation circuit of claim 1 wherein the microphone is selected from one or more of the following group: alt condenser, alt electrical condenser, alt dynamic, alt ribbon, alt carbon, alt piezoelectric, alt fiber optic, alt 17/18 laser, alt liquid, alt MEMS, alt contact, alt boundary, alt directional, alt shotgun, alt parabolic, alt hydrophone, alt wireless, and alt ground to sense the frequency produced by the oscillation circuit.

6. The parasitic oscillation circuit of claim 1 wherein the speaker microphone is selected from one or more of the following group: alt diaphragm, alt moving iron, alt ground, alt piezoelectric, alt magneto-static, alt magneto-restrictive, alt electrostatic, alt ribbon and planar-magnetic, alt blending wave, alt flat panel, alt heil air motion transducer, alt transparent ionic conduction, alt plasma arc, alt thermos acoustic, alt digital, alt wireless and alt contact.

7. The parasitic oscillation circuit of claim 1 wherein the speaker is in contact with the container, vessel or pipe of the oscillation circuit with wires or through wireless connection.

8. The parasitic oscillation circuit of claim 1 wherein the microphone is in contact with the container, vessel or pipe of the oscillation circuit with wires or through wireless connection.

9. A method of using the parasitic oscillation circuit of claim 1, wherein the circuit is used for measuring the growth of biofilm, algae or bacteria in containers, vessels or pipes in micro liter or micro gram quantities or in micron for their thickness.

10. The method of using the parasitic oscillation circuit of claim 9, wherein the containers, vessels or pipes are continuous.

11. The method of using the parasitic oscillation circuit of claim 9, wherein the containers, vessels or pipes are non-continuous.

12. A method of using the parasitic oscillation circuit of claim 1, wherein the circuit is used for monitoring the growth of biofilm, algae or bacteria in containers, vessels or pipes in micro liter or micro gram quantities or in micron for their thickness.

13. The method of using the parasitic oscillation circuit of claim 12, wherein the containers, vessels or pipes are continuous.

14. The method of using the parasitic oscillation circuit of claim 12, wherein the containers, vessels or pipes are non-continuous.

15. A method of using the parasitic oscillation circuit of claim 1, wherein the circuit is used for measuring the ruptures or leaks of liquid, powder, semi-solid in the underground or over the ground pipelines.

16. A method of using the parasitic oscillation circuit of claim 1, wherein the circuit is used for monitoring the ruptures or leaks of liquid, powder, semi-solid in the underground or over the ground pipelines.

17. The parasitic oscillation circuit of claim 1 wherein the microphone and speaker are remotely sensed without being connected with wires by the container, vessel or pipe for measuring and monitoring the content of the container, vessel or pipe through the oscillation frequency of the oscillation circuit.

* * * * *